(No Model.) 10 Sheets—Sheet 5.
C. E. SACKETT.
Combined Plow, &c.
No. 238,970. Patented March 15, 1881.
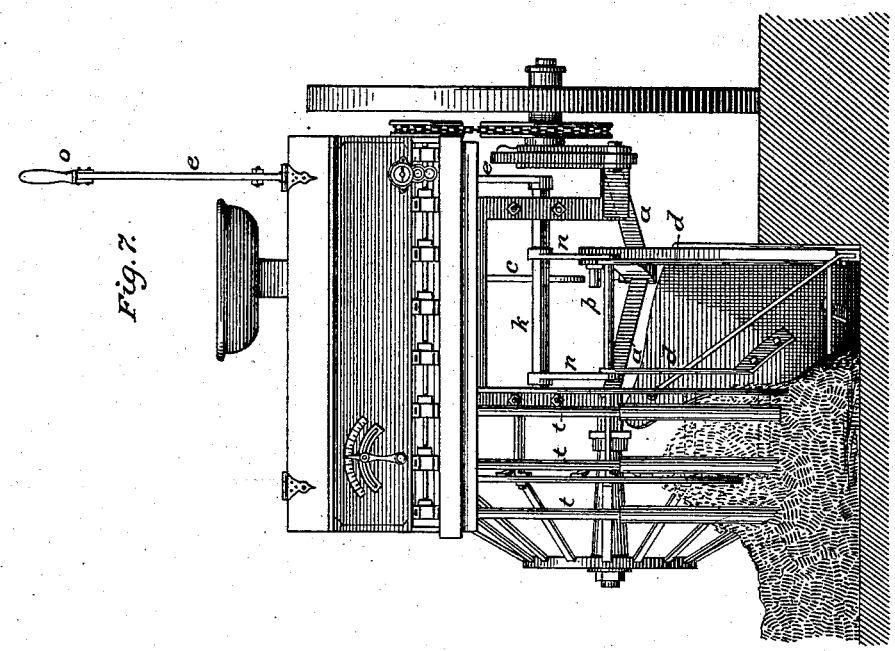
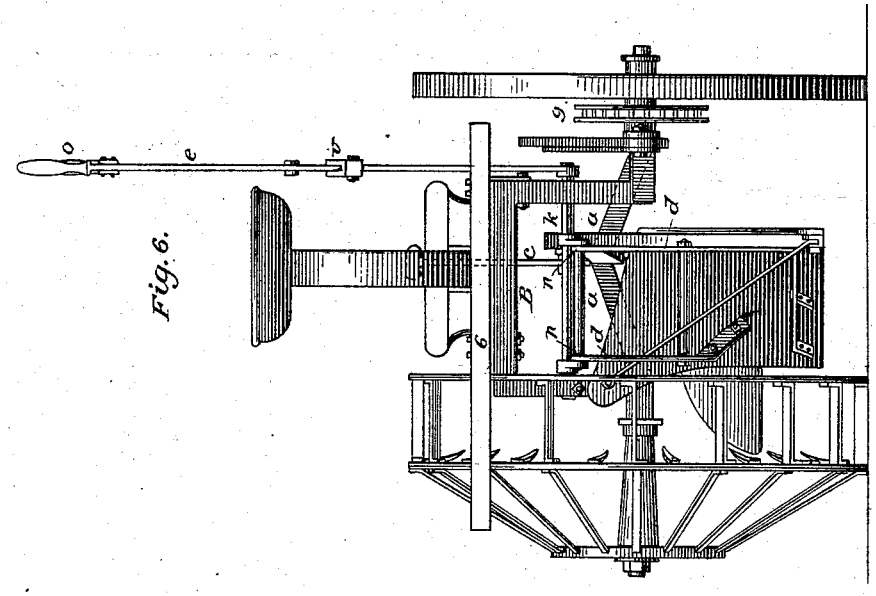
Attest:
R. F. Barnes
S. W. Luly
Inventor:
Charles E. Sackett
by Ellis Spear
Attorney (No Model.) 10 Sheets—Sheet 6.

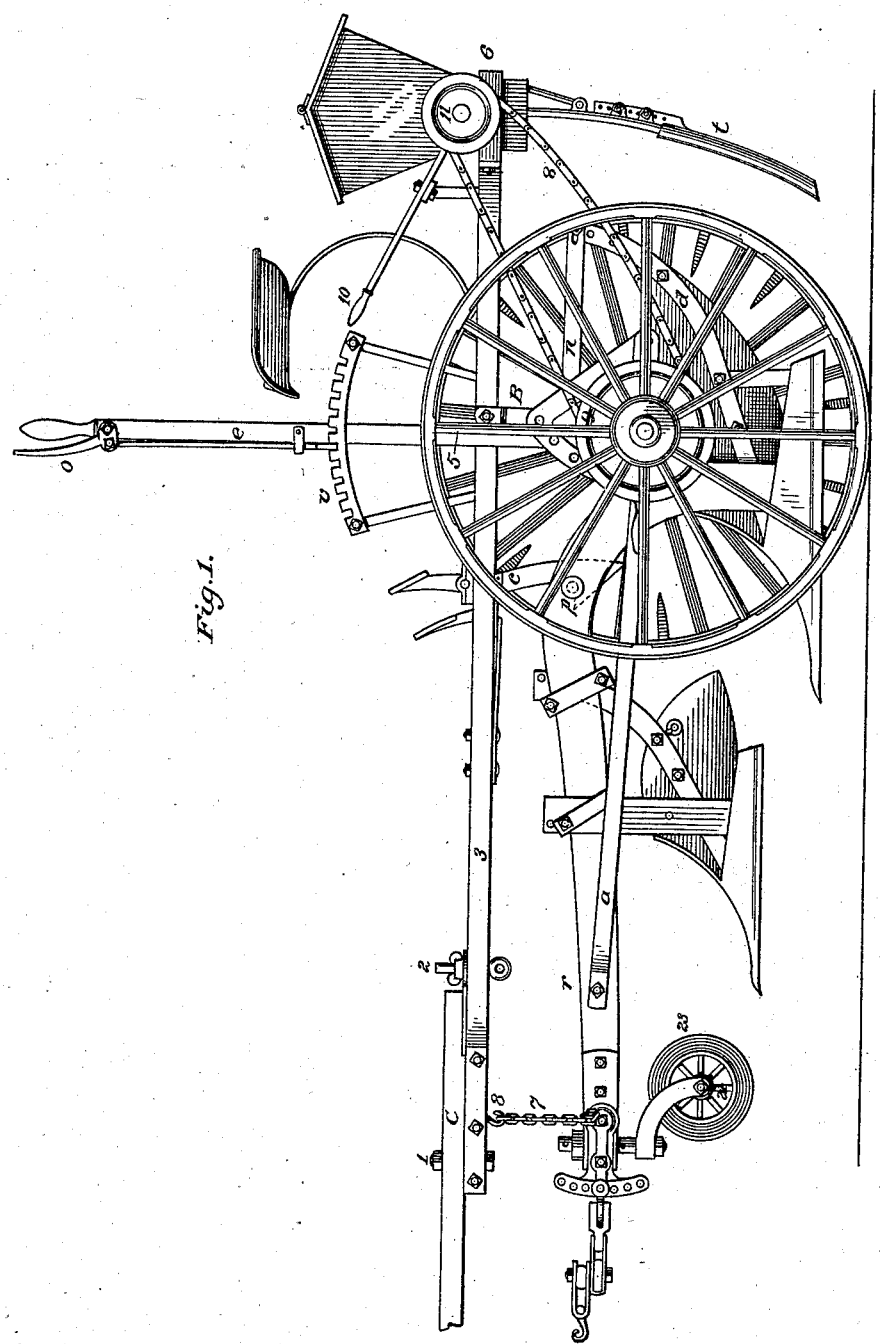

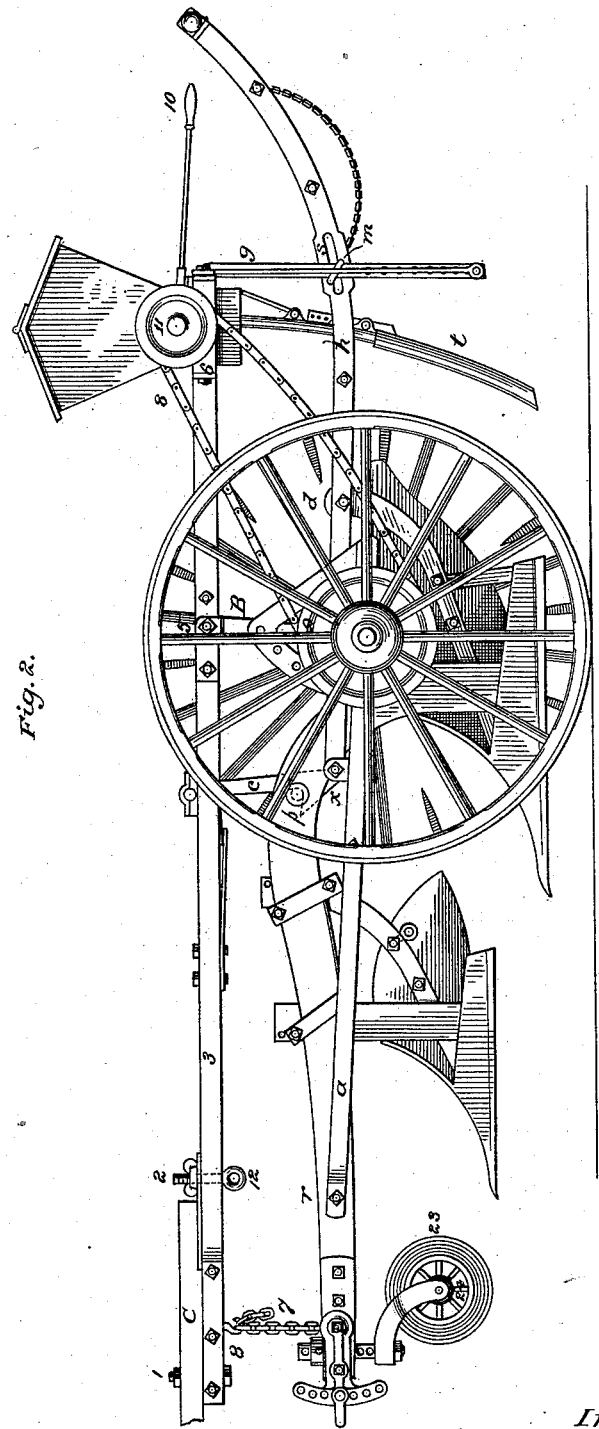

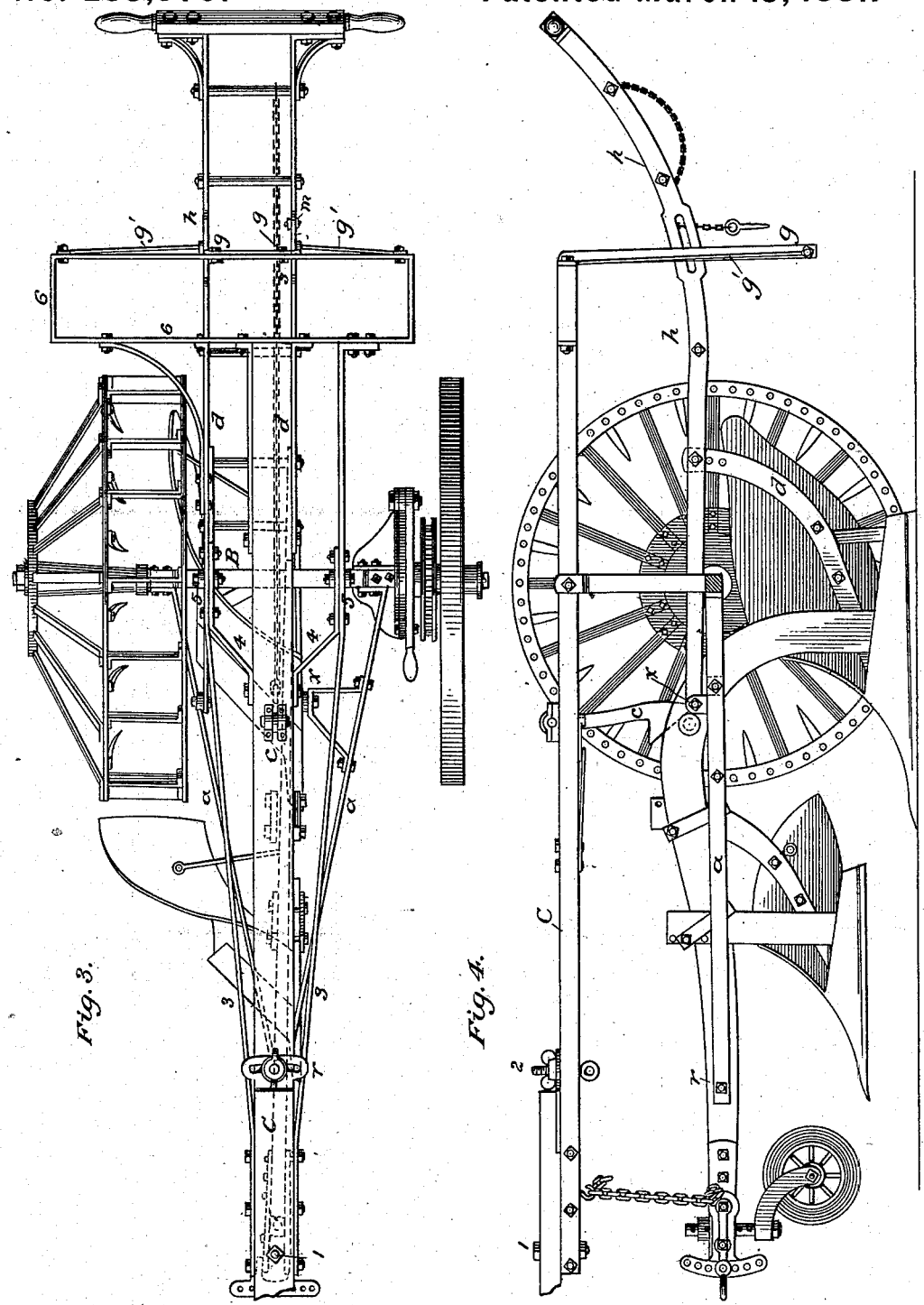

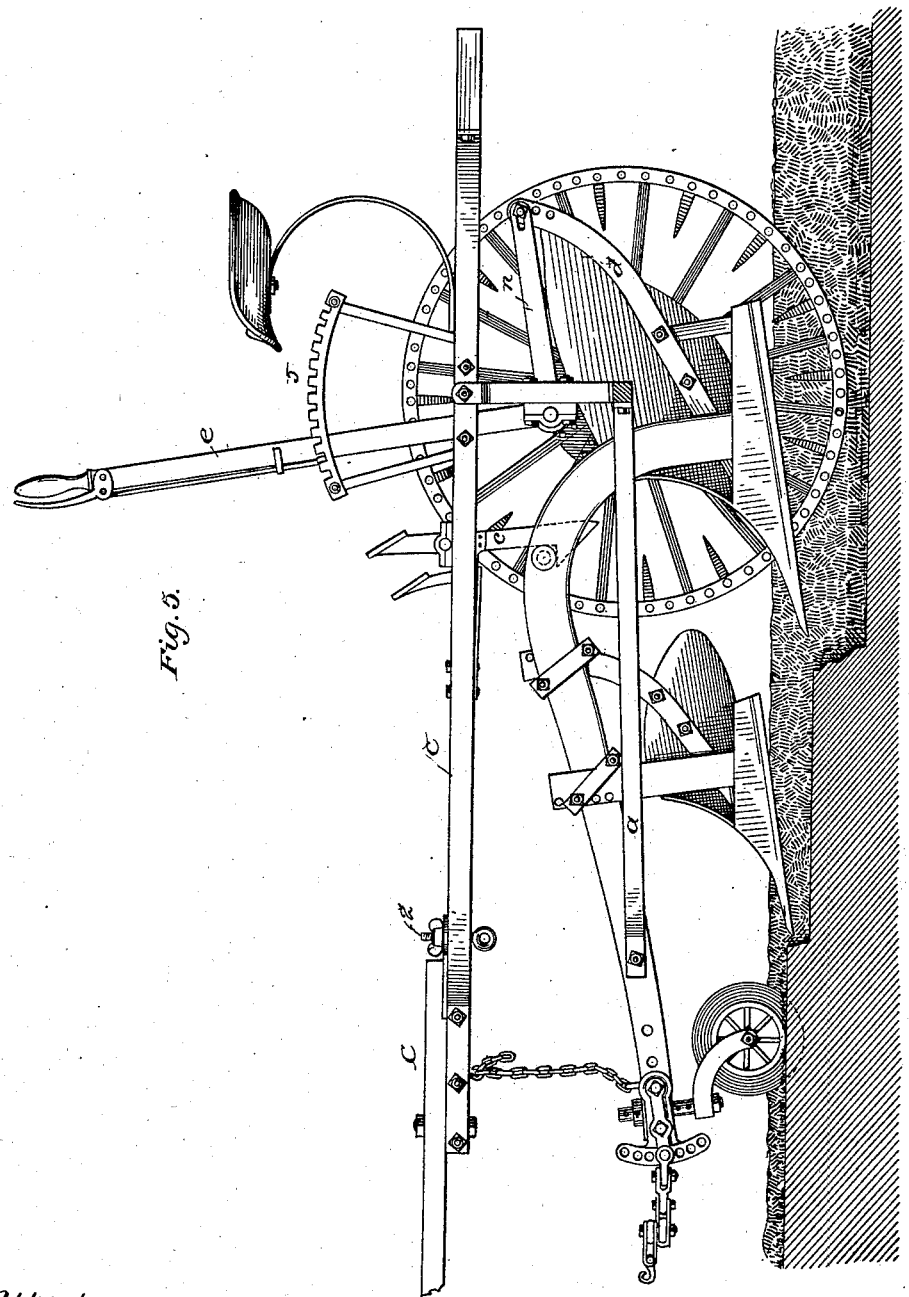

C. E. SACKETT.
Combined Plow, &c.

No. 238,970. Patented March 15, 1881.

Attest:
R. J. Barnes
S. W. Luny

Inventor:
Charles E. Sackett
by Ellis Spear
Attorney (No Model.) 10 Sheets—Sheet 8.

C. E. SACKETT.
Combined Plow, &c.

No. 238,970. Patented March 15, 1881.

(No Model.) 10 Sheets—Sheet 9.

C. E. SACKETT.
Combined Plow, &c.

No. 238,970. Patented March 15, 1881.

Attest:
R. F. Barnes.
Geo. W. Luby

Inventor:
Charles E. Sackett
by Ellis Spear
Attorney.

N. PETERS, PHOTO-LITHOGRAPHER, WASHINGTON, D. C.

(No Model.)  10 Sheets—Sheet 10.
C. E. SACKETT.
Combined Plow, &c.
No. 238,970.  Patented March 15, 1881.
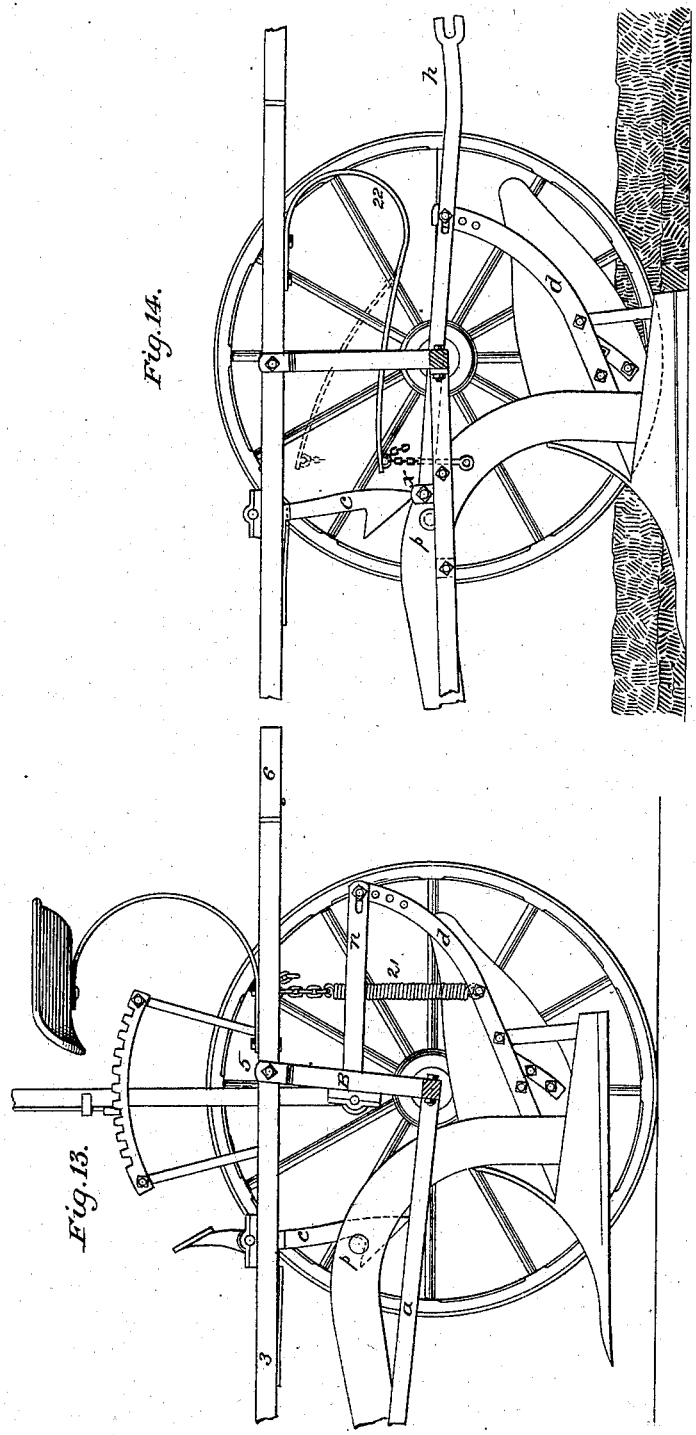
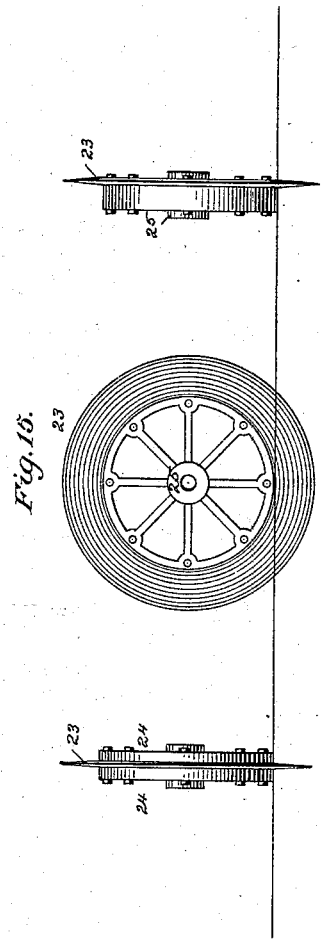
Attest:
R. F. Barnes.
L. W. Seely.
Inventor:
Charles E. Sackett
by Ellis Spear
Attorney

UNITED STATES PATENT OFFICE.

CHARLES E. SACKETT, OF MATILDA FURNACE, PENNSYLVANIA.

COMBINED PLOW, &c.

SPECIFICATION forming part of Letters Patent No. 238,970, dated March 15, 1881.

Application filed January 14, 1881. (No model.)

*To all whom it may concern:*

Be it known I, CHARLES E. SACKETT, of Matilda Furnace, in the county of Mifflin and State of Pennsylvania, have invented a new and useful Improvement in Combined Plow, &c.; and I do hereby declare that the following is a full, clear, and exact description of the same.

My invention is an improvement upon the general form of the agricultural implement described in Letters Patent granted me on the 30th day of November, 1879, and the 16th day of October, 1880, numbered, respectively, 220,176, 220,177, and 233,809.

The object of this invention is to improve the details of construction of the frame-work and supporting parts of the apparatus, and to adapt the said frame-work and supporting parts for use in connection with other forms of tools—such as the ordinary cultivating-shovels—so that the same frame-work which is to be used ordinarily with the plowing and harrowing and seeding devices may be used either as a riding or walking cultivator. I have thus sought, by the devices hereinafter described, to adapt the mechanism, by taking away some parts and adding others, for use throughout the entire planting-season for the purpose of plowing, harrowing, sowing, and cultivating.

Figure 8:
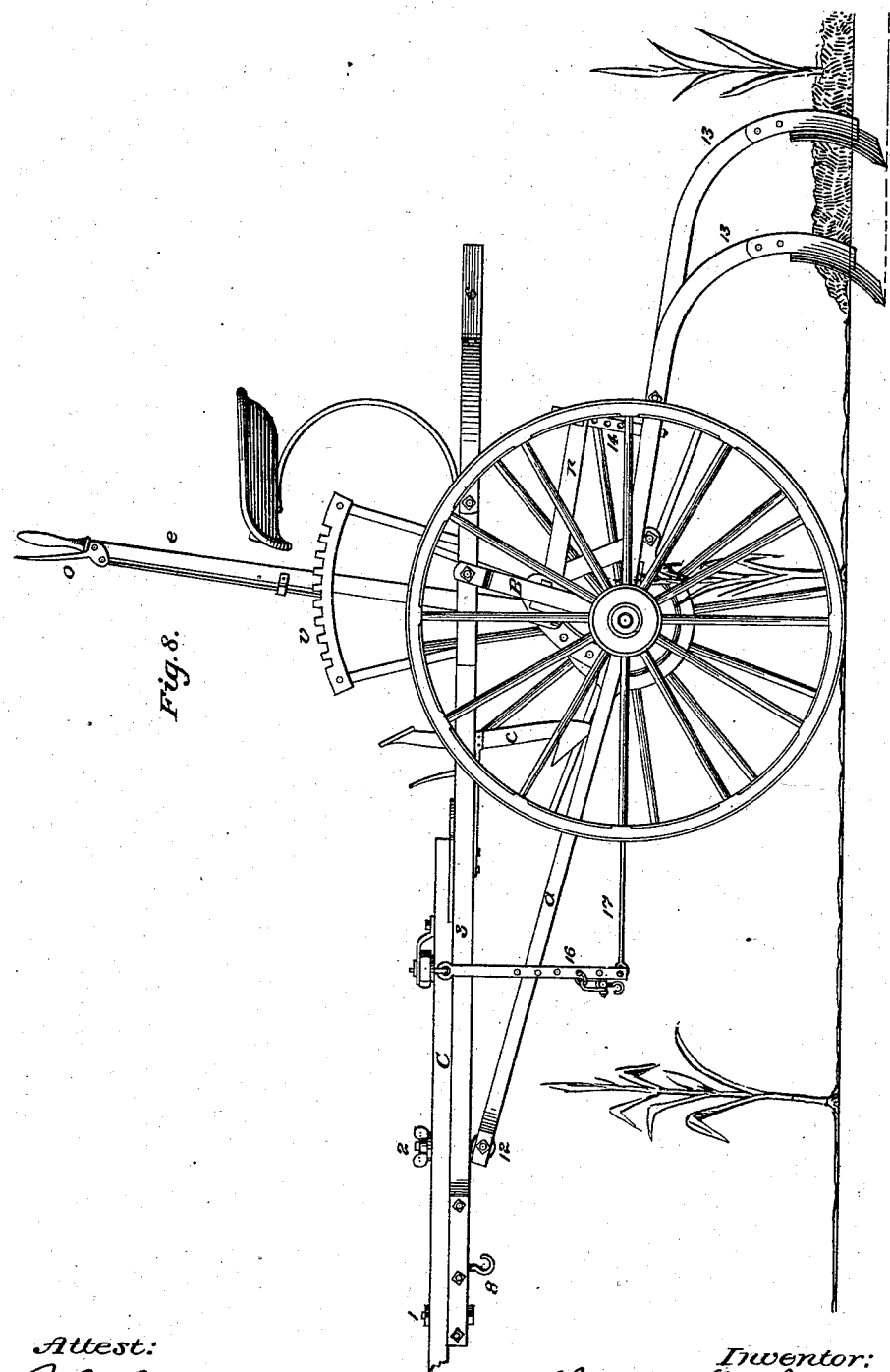
Figure 9:
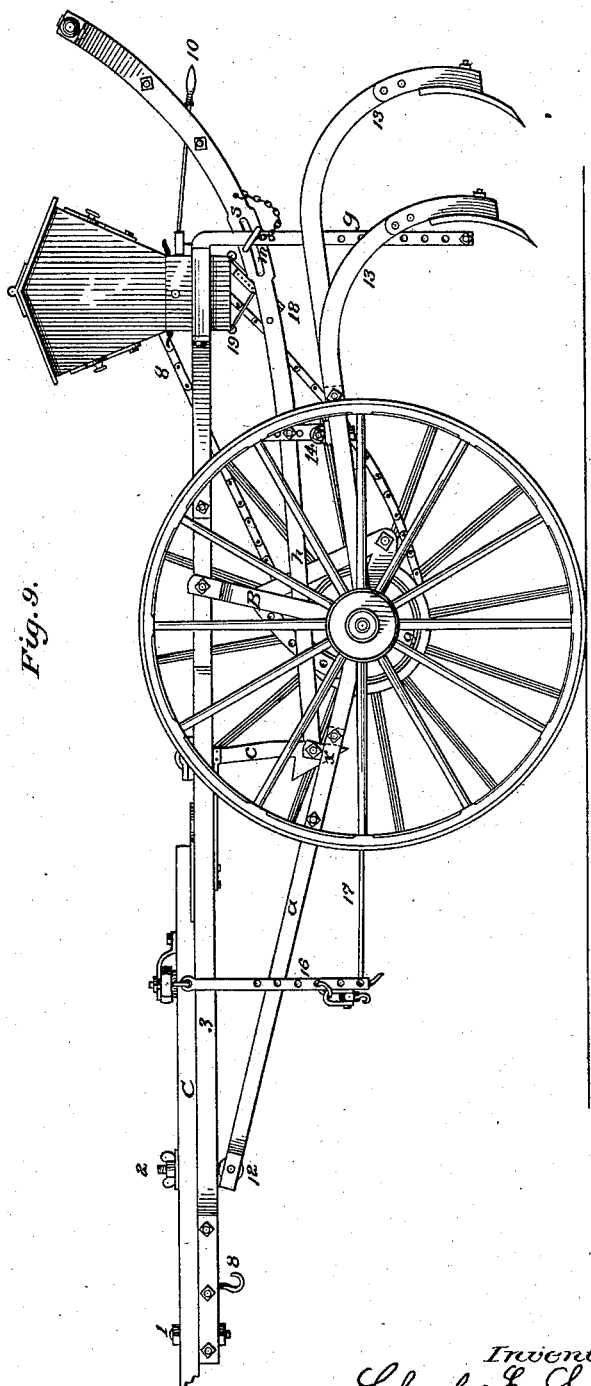
Figure 10:
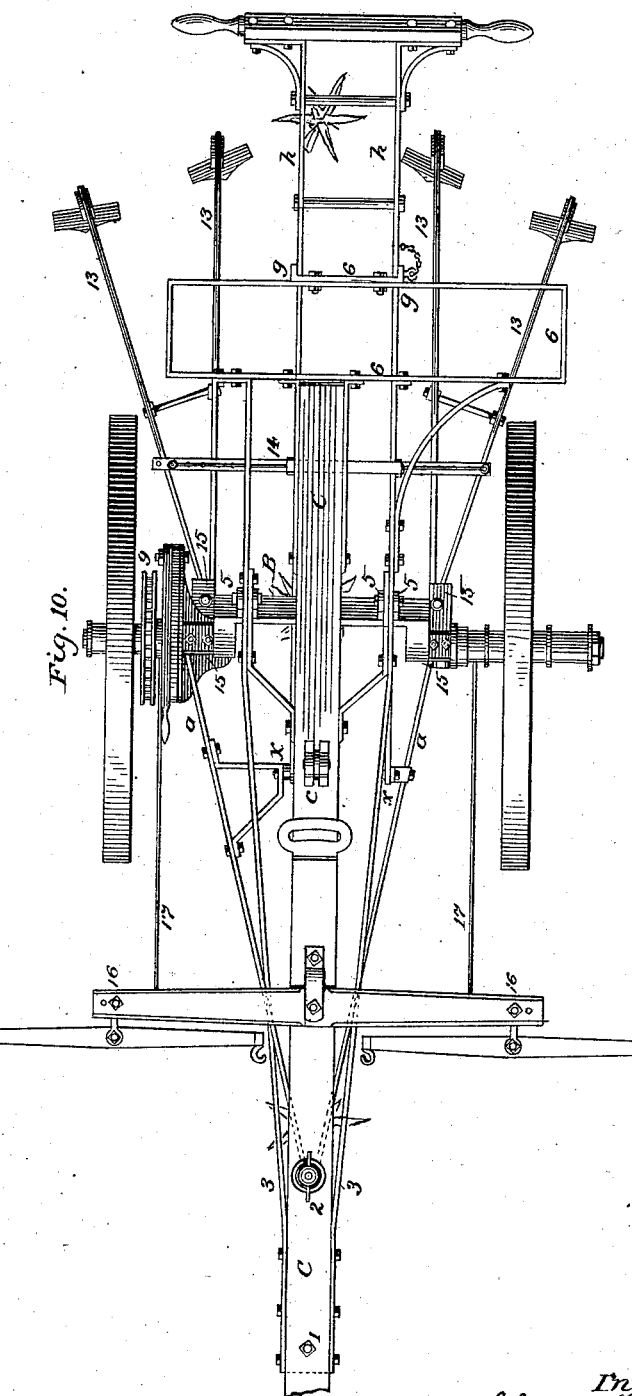
Figure 11:
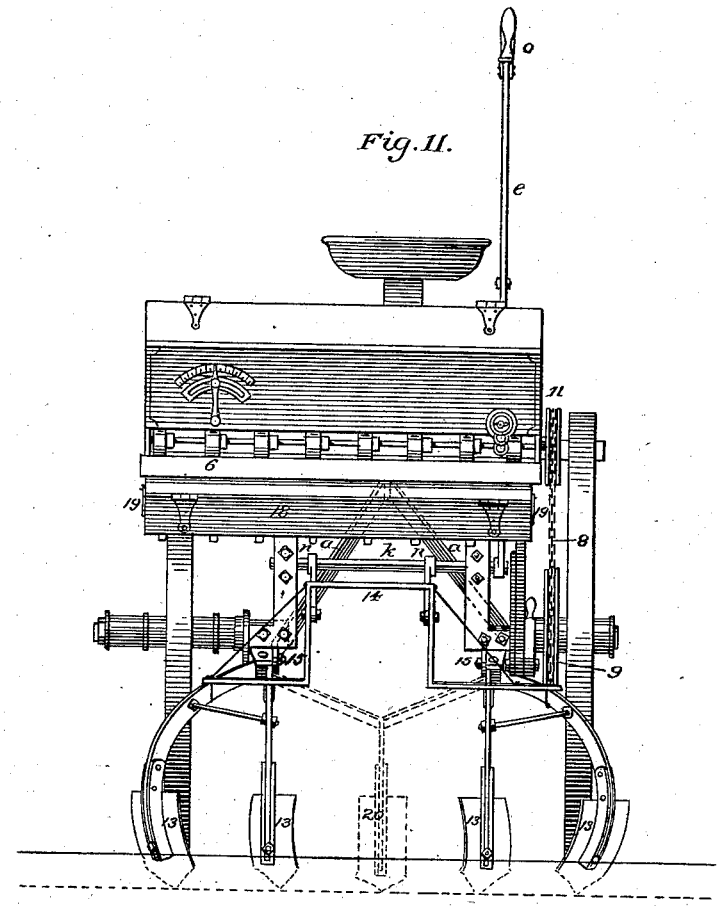
Figure 12:
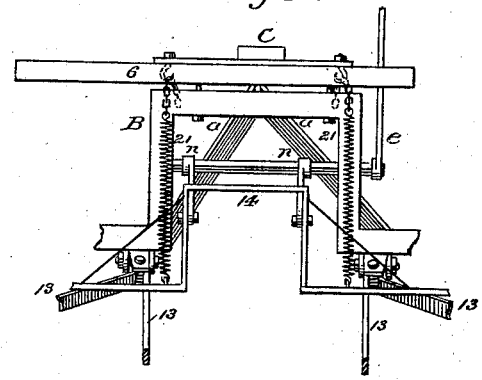

In the drawings hereunto attached, Figure 1 represents a side elevation of my improved apparatus adapted for use as a combined plow, harrow, and seed-drill, and for riding. Fig. 2 is a side elevation of the same adapted for walking. Fig. 3 is a plan view of the same with the seed-drill removed; Fig. 4, a side elevation of the same with the land-wheel removed. Fig. 5 is a side elevation with the land-wheel removed, showing the details for elevating and supporting when the implement is used for riding. Fig. 6 is a rear view of Fig. 5 with the plow lifted, and Fig. 7 a rear view of the same with the plow lowered. Fig. 8 is a side elevation of the apparatus, showing the frame and cultivating-shovels attached. Fig. 9 shows a side elevation of the same with the seed-drills for broadcast sowing, and with the apparatus adapted for walking. Fig. 10 is a plan view of the same. Fig. 11 is a rear view of the apparatus adapted for riding with the seed-drill and shovels attached. Fig. 12 shows certain devices for aiding in lifting the shovels. Figs. 13, 14, and 15 represent details of construction hereinafter described.

Among the modifications of my said improved apparatus whereby I have adapted a large part of the structure to more extensive and varied use will be observed the substitution of a bent for a straight axle. This is shown more clearly in Figs. 6 and 7, though also represented in the other figures in side elevation, and marked B. This bent axle is necessary, as in other cultivators, in order to allow the axle to pass over one row of the corn, and with the introduction of the bent axle material modifications of the other parts become necessary. First, when the apparatus is to be used as a plowing and pulverizing implement, whether for walking or riding, as shown in the figures from 1 to 7, inclusive, other means must be provided for attaching the plow-beam to the axle than those shown in my former patents. It is also desirable, for the purpose of reducing the number of parts, that the same means which are used for connecting the plow-beam to the axle will also be serviceable for connecting the main frame to the axle when the plow is omitted. For this purpose, therefore, I have provided the yoke-braces *a a*. (See Figs. 1 and 3.) The rear ends of these braces are bolted rigidly to the axle, as near as possible to the extremities, and the forward ends are pivoted upon the plow-beam well forward, as shown at *r*.

It will be borne in mind that the draft is applied to the end of the plow-beam in the usual manner, and it is clear from an inspection of Fig. 3 that the pulverizing-wheel, as well as the supporting-wheel upon the landside, will be drawn along evenly with the plow by means of the braces aforesaid; but when the plow is removed the same braces may be lifted and used to yoke the axle to the tongue C by means of the eyebolt 2, as shown in Fig. 8. It will also be observed that, as the braces *a a* are attached to the beam by the pivot *r*, the plow may be easily raised or lowered in respect to the axle and other parts. At the same time these braces always hold the plow and wheels in stiff relation laterally to each other, as in turning, which is very important, in order to maintain the efficient working of the plow in connection with the pulverizer.

The plow is therefore conveniently secured to the axle and wheels with the same facility of motion obtained by other connections with the straight axle, as shown in my said patents, and without duplication of parts when the plow is omitted in order to change the apparatus into a cultivator. This construction, however, necessitates further modification of the apparatus for raising and lowering the plow, as required in the operation of plowing and for holding it in place.

In order to sustain still more securely the lateral relation to the plow and wheels, and to provide a supporting-frame in connection with the wheels and with the team, I provide the tongue C, which extends back beyond the axle (either just below or above the arch thereof) as far as the seed-drill frame. This tongue is formed of two parts, the front part being pivoted upon the rear or fixed part, so that it may be adjusted at a slight angle and held by means of the clevis-bolt 2, and may be turned to the right or left to adjust it to the line of draft from the plow-clevis. Two braces, 3 3, (shown in Figs. 1 and 3,) are connected to the front end of the fixed part of the tongue C, and extend rearward behind the axle, where they are bolted to the transverse seed-drill frame 6 6. They are connected to the arch of the axle by means of pivots, which pass through ears 5 5 fixed to the axle, or in any other convenient way which shall permit vertical movement of the tongue in relation to the axle. These braces 3 3 are re-enforced and strengthened by other braces, 4 4, the inner ends of which are bolted to the tongue C, as shown in Fig. 3. This secures firm connections, so that motion of the tongue to right or left may turn the wheels and also turn the point of the plow. It is also evident that a slight backing of the team, while keeping the frame-work level, will tend to push back the arch of the axle and slightly raise the forward end of the plow-beam.

It will be obvious from an inspection of the drawings and the description heretofore given that the means for raising and lowering the plow require a modification over my former patents in order to render them effective in connection with the bent axle. These devices are described first in connection with the apparatus when adapted for use as a walking implement.

In place of the ordinary rigid handles, short posts d d are provided, as shown clearly in Figs. 2, 6, and 7. These are attached like the ordinary handles, but curve upward just back of the mold-board. Upon them are pivoted handle-levers h h, which extend a little way forward of the axle, where they are connected to the braces a a by pivotal bolts and short ears fixed on said braces. The point of connection is shown at x. By means of these handle-levers, acting as levers of the second order, the plow may be lifted, resting by means of the gage-wheel upon the earth upon the front end of the beam. The plow may be so lifted until the pivoted hook c catches over the pin p in the plow-beam, thereby suspending the plow upon the frame, as shown in Figs. 2 and 5. The pin p is located at about the center of gravity of the plow and its appurtenances. The hook c is provided with a spring to cause it to engage with the pin when the beam is raised. The forward end of the plow-beam is connected to the frame by a chain or other flexible connection, as shown at 7, Figs. 1, 2, and 4. When, therefore, the rear end of the plow has been raised so as to cause the hook to engage with the pin p, the point of the plow may be raised by depressing the handles and tipping the plow on pin p as a fulcrum. By these means the plow can be handled by very slight pressure communicated through the levers h.

In order to avoid the necessity of constant attention on the part of the operator to preserve uniform depth of cut, and at the same time to add to the lateral stability of the plow and its constant relation to the harrow-wheel, I provide two guide-posts, g g, attached to the rear end of the carrying-frame 6 6. They are stiffened by lateral braces g', (shown more clearly in Figs. 3 and 4,) and pass just outside of the handle-levers h h. The lever-handles are provided with a short slot, which, as they are raised or lowered, may intersect any one of the sets of holes in the guide-posts g, and by means of a pin passing through holes and slots the lever-handles may be fixed at any required point, and when so fixed they maintain the plow at a uniform depth, and also hold it in just relation to the wheel. These devices also serve to hold the handles clear of the ground when the plow is hooked up ready for transportation. This part of the apparatus, in connection with the bent axle and the flexible connection, renders the action of both plow and wheels independent of each other in respect to vertical movement, so that the harrow-wheel may ride over an obstruction without disturbing the motion of the plow, while the plow itself may be adjusted vertically at the will of the operator without changing the vertical position of the wheels. To allow this free play in stony ground it is not advisable to use the pin in the guide-posts g, but to allow the wheels free vertical play while the operator gives his attention to the plow alone. Substantially the same devices are represented in Fig. 1 as adapted to the combined plow and harrow when used for riding.

In order to change the implement from a walking to a sulky plow, the lever-handles h are removed and the crank-shaft k, Figs. 6 and 7, is mounted in journals attached to the vertical parts of the bent axle, as shown more clearly in Fig. 7. This shaft is provided with a lever, e, which rises by the side of the driver's seat and conveniently within his reach. It is also provided with two crank-arms, n n, which extend to the rear, and are pivoted upon the posts d d in the same manner as were the handle-levers h h. These posts d d will be provided with a series of holes for vertical adjustment in relation to the arms $n$. The lever $e$ has ordinary guide and catch mechanism, the fixed part of which may be mounted upon the frame or upon the axle. In Figs. 1 and 5 it is represented as mounted upon the frame.

The method of operation is obviously the same as that heretofore described in connection with the lever-handles.

The spring-hook $c$ is represented in Fig. 1 as projecting above the frame, so that when the apparatus is used for riding said hook may be operated by the foot. When used for walking this hook may have a small cord attached below the frame, by which it may be pulled back for unhooking. The chain 7, heretofore described, obviates the necessity of too great forward movement of the lever to bring the gage-wheel upon the earth or press it near the earth when the weight is thrown upon it in lifting the rear part. When this chain is hooked up and the lever $e$ is pushed forward the weight is thrown upon the chain instead of upon the gage-wheel. Of course when the plow is unhooked no weight falls upon the necks of the horses, and only very slight when it is hooked up, as the hook $c$ is only a short distance in front of the axle. Indeed, all this weight may be counterbalanced by the driver or the seed-drill. The seed-drill itself fits into and rests upon the frame 6 6. It is held in this frame in any convenient way, and has no other connection, excepting that of a loose chain running from the feed-pulley to the land-wheel. The chain and pulley 11 are shown in Fig. 2. The chain may be sufficiently loose to allow the required movement of the wheel without interfering with the effective working of the seed mechanism.

It should be observed that the seat may remain in place whether the implement be used for riding or walking.

I propose to use a seed-drill of the most approved construction to sow both fertilizers and grain together or separately. In place of the ordinary holes, however, I propose to use small dropping-tubes $t$ $t$, Figs. 2 and 7, preferably about four inches apart. They are placed directly behind the pulverizing-wheel, and therefore move in the loosened earth, and require no other protection than the wheel itself. It will be apparent from their situation that the seed will be dropped among the falling earth, and therefore no special covering devices are required, and the tubes may be placed near each other, for the reason that, no hoes being required, there is no danger of clogging. Tubes may be placed as close as three inches apart, or even less. The action of the seed-drill is checked at the will of the operator by a small lever, 10, which throws the chain-wheel 11 out of gear.

Figs. 8 to 12, inclusive, show the manner of adapting the frame heretofore described, with the bent axle and other parts not specifically pertaining to the plow, for use in connection with devices for cultivating.

To adapt the apparatus for use as a cultivator the seed-drill and plowing devices are all released by removing three bolts—that through the beam and yoke-braces and the bolts which connect the lever-handles to the posts $d$. The yoke-braces $a$ $a$ are then raised at the forward end and connected to the eyebolt 2. The movable part of the tongue may then be run back upon the fixed part and rebolted, as shown in Fig. 8. The cultivating-shovels 13 are then bolted to the axle at eyebolts 15. The lifting and spacing bar 14 is placed in position, as shown in Figs. 8, 9, and 10, and by means of the vertical parts of its arch, provided with a series of holes, is connected to the crank-arms $n$, heretofore described. Manifestly, if desired, the lever-handles $h$ $h$ may be connected to this bar in a similar manner. A duplicate land-wheel is then substituted for the pulverizing-wheel. Draft-rods 17, with lowering-bars 16, Fig. 8, are provided for the attachment of the whiffletree. These rods, of course, running back to the axle, are shown in Fig. 10.

The operation of the cultivating-shovels is the same as in the case of the plows in respect to the lifting apparatus.

The seed-drill may be placed upon its frame and adapted to broadcast sowing by removing the dropping-tubes and opening all the seed-passages, for which provision is made in the shelving board 18, Figs. 9 and 11, suspended at any desired angle by the hooks 19 19. This board serves to direct the seed as it is dropped. A fifth shovel, 20, may be added in the same manner as is usual in cultivating implements, to adapt the apparatus to broadcast sowing. This is shown in dotted lines in Fig. 11.

In Figs. 12 and 13 I have shown spiral springs 21 21, placed at any convenient point between the frame and plow or cultivator to aid in raising their weight, but without sufficient power to interfere with their action. At one end of each spring is a link-chain to adjust the tension.

In Fig. 14 I show flat C-springs 22, adapted to the same purpose. These springs also tend to divide the weight when the plow is hooked up between the front and rear of the main axle.

It is desirable, when plowing sod-land free from stone, to use a rolling colter, and in order to avoid the extra length of plow-beam and attaching apparatus necessary for a separate gage-wheel and rolling colter, I have shown, in Fig. 15, these two combined in one. The colter is a thin circular plate of steel sharpened at its periphery, and either bolted between two gage-wheels, 24, or by the side of one, 25.

Having thus described my invention, what I claim is—

1. The combination of the pulverizing-wheel, the bent axle, and the land-wheel with the plow flexibly suspended beneath said bent axle and discharging into said wheel, and with devices for preventing lateral movement of said plow, whereby vertical movement of the plow and proper relation to the pulverizing-wheel are maintained, substantially as described.

2. The combination of the bent axle B, the tongue C, the yoke-braces a a, fixed directly to said axle and adapted for connection either to the plow-beam or to the tongue, as set forth.

3. The combination of the plow-beam, the yoke-braces a a, fixed directly to the axle, the axle B, the pivotal supports 5 5, and the carrying-frame composed of the jointed tongue C, the diagonal braces 3 3, the re-enforcing-braces 4 4, and terminating preferably in the frame 6 6 to support a seed-drill, the whole being bolted firmly together and pivoted to the axle through the supports 5 5, substantially as described and shown.

4. The combination, with the wheels, the bent axle, and the braces a a, adapted for pivotal connection either to the plow-beam or the tongue C, of the described lifting devices, and adapted to raise either the plow or cultivator-teeth, as set forth.

5. The combination of the wheels, the bent axle, the tongue C, the hook c, the plow-beam with pin p, and lifting-levers, substantially as described.

6. The combination of the wheels, the bent axle B, the lever-handles h, the tongue C, and the braces a, said lever-handles h being pivoted upon the braces a, as set forth.

7. The combination of the tongue C, the guide-posts g, fixed to its rear extension, the lever-handles h, pivoted upon the braces a, bent axle B, wheels, and the devices for turning the earth, substantially as described.

8. The tongue C, consisting of a fixed and movable part extended to the rear of the bent axle B and pivoted thereon, in combination with the frame 6 6, adapted to receive a seed-box, and with braces a a and bent axle B, substantially as described.

9. The combination, with the tongue C and braces 3 3, pivoted upon the bent axle B at its upper part, of the yoke-braces a, fixed to said axle near the wheels and adapted to be pivoted to the tongue C or to the plow-beam, and also in combination with the eyebolts 15, fixed to the rear of said axle and adapted to hold cultivator devices when desired, substantially as described.

10. The combination, with the plow and pulverizer-wheel to receive the furrow, of the seed-tubes t t, located directly in rear of the said wheel, whereby the seed are dropped in the midst of the earth as it falls from the wheel, substantially as described.

In testimony whereof I have signed my name to this specification in the presence of two subscribing witnesses.

CHARLES E. SACKETT.

Witnesses:
J. HIRAM SILLIMAN,
FRANK H. HARRISON.